Nov. 10, 1953  H. R. SNYDER  2,658,300
HOLDER FOR FISHING LINE LEADERS
Filed Nov. 7, 1951
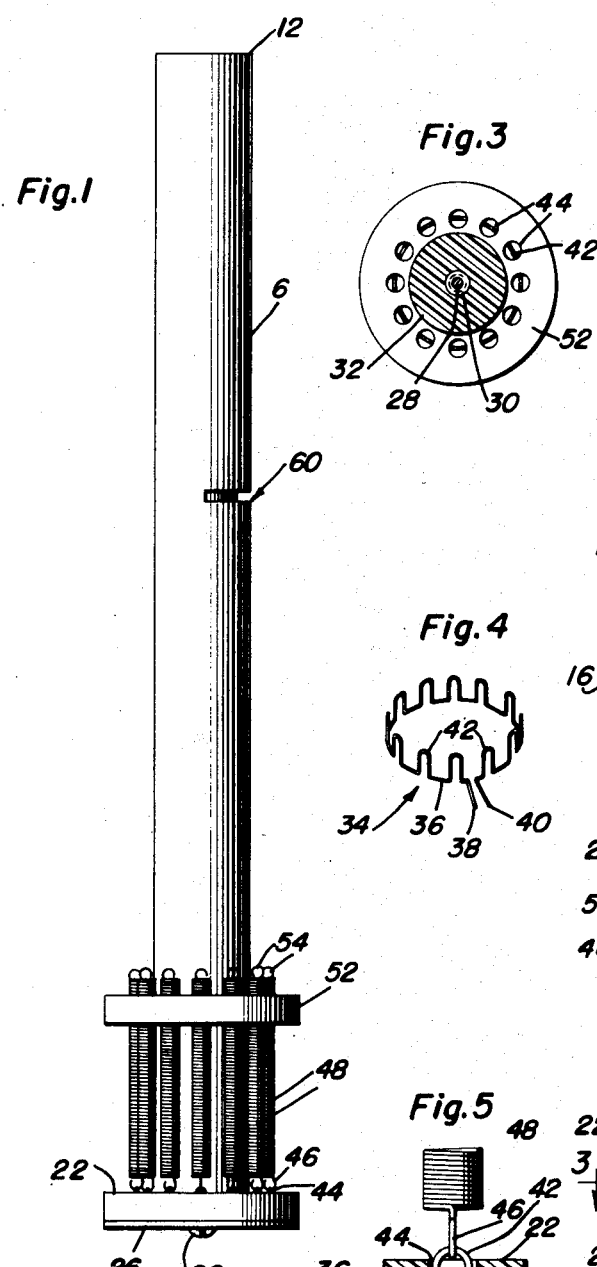
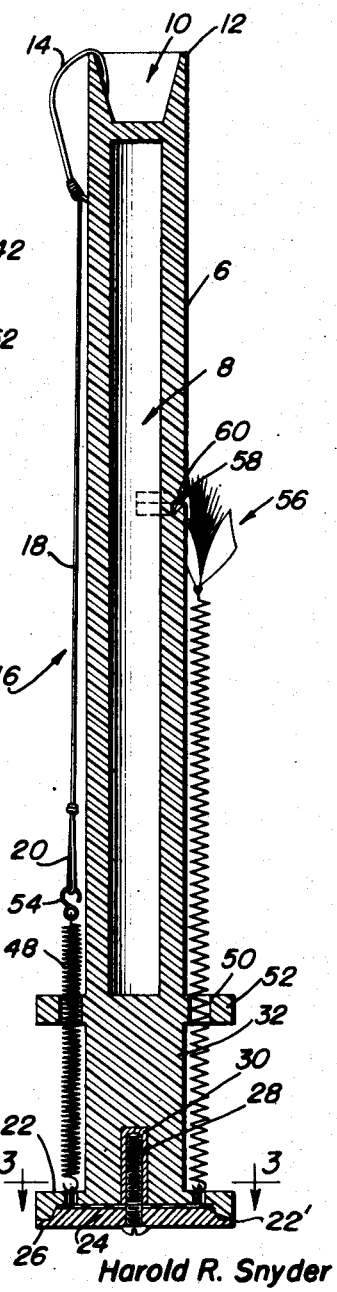
Harold R. Snyder
INVENTOR.

Patented Nov. 10, 1953

2,658,300

UNITED STATES PATENT OFFICE 2,658,300

HOLDER FOR FISHING LINE LEADERS

Harold R. Snyder, Perkasie, Pa.

Application November 7, 1951, Serial No. 255,171

4 Claims. (Cl. 43—57.5)

The present invention relates to an instrument which may be carried in a fisherman's tackle box and which is expressly constructed to serve as a holder and carrier for a plurality of fishing line leaders or snells as they are frequently called, and the obvious object of the invention is to provide a device in this category which is characterized by highly desirable structural improvements.

It will be evident from the foregoing that the art to which the invention relates is well developed, that there are many and varied styles and forms of holders which have been offered for use by others. As a matter of fact, it is common in this line of endeavor to provide a holder which is characterized by a body portion, with means at one end to accommodate fish hooks and means at the opposite end to separably connect the looped ends of the gut or nylon elements to the other end of the body by slack take-up spring means. In carrying out the principles of the present invention, a construction is provided which is simple, practical and economical and provides that which fulfils the requirements of manufacturers and needs of fishermen and others.

More specifically, the holder is thought to be unique in that it is preferably in the form of a hollow bouyant tubular body, there being socket means at one end to accommodate a plurality of fishhooks and a plurality of selectively usable coil springs at the opposite end, said springs having S-shaped hooks for accommodation of the looped ends of the gut or equivalent leaders.

More specifically, novelty is predicated on a practical construction or arrangement for fastening and arranging the coil springs in systematic readily available relationship.

Then, too, novelty has to do with the stated assemblage of coil springs having hooks which may be conveniently connected with fishing flies, the latter to be anchored at their hook-equipped ends and a keeper seat provided therefor in the external surface of the tubular body.

Other objects and advantages will become more readily apparent from the following description and the accompanying sheet of illustrative drawings.

In the accompanying sheet of drawings wherein like numerals are employed to designate like parts throughout the views:

Figure 1 is an elevational view of a holder for fishing line leaders constructed in accordance with the principles of the present invention;

Figure 2 is a view in longitudinal section of the holder appearing in Figure 1 with a conventional snell shown fastened on the left and a fishing fly shown fastened on the right;

Figure 3 is a cross section on the plane of the line 3—3 of Figure 1, looking in the direction of the arrows;

Figure 4 is a perspective view of one of the components of the over-all construction; and Figure 5 is an enlarged fragmentary view in section and elevation showing the manner in which one of the coil springs is anchored on the tubular body.

Referring now to the various views of the drawings by way of reference numerals and accompanying lead lines the aforementioned elongated tubular body is denoted by the numeral 6 and it is preferably made of some light-weight, durable and non-corridible material. Certain commercial plastics having been found as appropriate for the present. There is a closed air chamber 8 in the interior of the body which extends substantially from one end of the device to the other and which renders the over-all body bouyant. An axial recess or pocket 10 is formed in one end of the body 6 and the marginal edge portion of the pocket at 12 provides a satisfactory ways and means for the accommodation and retention of the bill portions of the fishhooks, one of which is shown at 14 in Figure 2. The pocket portion serves as a receiver and the edge of the wall portion 12 serves as a convenient hanger for the hooks (only one shown). Incidentally, the hook is a part of the snell which is denoted generally by the numeral 16 and which includes a gut or equivalent leader 18 attached to one end to the fishhook and having a loop 20 at its opposite end.

The opposite end of the body is provided with a special head construction which is characterized by a circular head 22 provided with a cavity or recess 22' for receiving the plug portion 24 of an attachable and detachable clamping cap 26. The cap is held in place by a screw threaded headed fastener 28 which screws into an axial socket member 30 mounted in the end portion 32 of said body. This cap and head arrangement provides satisfactory ways and means to accommodate the especially bent ring-like wire member or unit 34 shown in Figure 4, which comprises a piece of wire 36 having free ends 38 and 40 which are adapted to be twisted or otherwise joined together. The wire is bent at circumferentially spaced points to provide U-shaped bends 42 which may be conveniently referred to as anchoring loops. The wire is clamped between the head 22 and cap 24 and fastened by the screw means 28 and the loops extend through circumferentially spaced holes 44 provided therefor in the head 22. This arrangement exposes the bight portions 42 of the loops which serve to accommodate hook means 46 on the adjacent ends of the extensible coil springs 48. The intermediate portions of the coil springs pass through openings provided therefor in a flange, the openings being denoted at 50 and the flange at 52. The selectively usable extensible and retractable free ends of the coil springs are provided with S-shaped hooks 54 which in turn serve to accommodate the looped ends of the gut leaders. The snelled hook unit 16 is shown in position on the left of the tubular body in the manner shown in Figure 2, wherein it will be observed that the fishhook is engaged in the pocket 10 and hung over the edge of the wall and the loop 20 is engaged with the S-shaped hook 54 on the extended coil spring 48. The latter is especially anchored on the head means of the tubular body. In case one desires to use flies, one of these is shown on the right hand side and is denoted by the numeral 56, the hook 58 thereof being engaged in a keeper groove which is formed in the surface of the tubular body somewhere near the mid-portion of said body.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. For use in an angler's tackle box, a holder and carrier for leaders comprising an elongate hollow buoyant body having an axial socket at one end the side wall of which is endless and serves as a hanging and retaining edge for a plurality of fish hooks, said body having a head at its other end, the marginal portion of said head projecting beyond the peripheral surface of said body and having circumferentially spaced coil spring accommodating holes therein, said body also having an outstanding flange on its intermediate portion in spaced parallelism with said head, said flange having circumferentially spaced coil spring receiving and accommodating holes therethrough in alignment with said first mentioned holes, an attachable and detachable wire unit carried by said head and having circumferentially spaced U-shaped spring anchoring loops, the latter being arranged in the holes in said head and having bight portions projecting accessibly beyond an adjacent surface of said head, and a plurality of coil springs individually arranged in the respective holes in said flange, said springs having hooks at their outward ends attached to said loops, the inward ends of said springs projecting through and beyond the holes in said flange and also having hooks formed therein, the latter hooks being arranged for attachment and retention of the usual looped ends on fishhook leaders.

2. The structure defined in claim 1, wherein said body is cylindrical in cross-section, said head being circular and having a shallow recess in one face, said wire unit being formed from a single length of wire and having circumferentially spaced inverted U-ends therein defining said loops and being seated in said recess, in combination with a circular cap, the latter having a central plug telescoping into said recess and clampingly pressing said unit into said recess, and means securing said cap to the cooperating end of said body.

3. A leader holder and carrier comprising a one-piece elongate body having an axial socket at one end the side wall of which is endless and serves as a hanging and retaining edge for a plurality of fishhooks, a circular head at the opposite end of said body, said head being provided with a shallow recess in one face and being further provided with a plurality of circumferentially spaced holes, a single wire member fitted into said recess, a cap separate from said head and having a circular plug portion fitting into said recess and clampingly engaging said wire member, means securing said cap to the adjacent coacting end of said body, said wire member having circumferentially spaced loops, and said loops extending accessibly through the adjacent respective holes in said head.

4. A leader holder and carrier comprising a body, said body being hollow and buoyant and having an axial socket at one end and a centrally recessed circular head at the other end, said head being provided with a plurality of circumferentially spaced holes therein, a ring-like wire member fitted in said recess, a cap having a plug portion conformable with and telescopingly fitting in said recess and clampingly contacting and holding said wire member in said recess, said wire member having integral U-shaped loops formed therein and said loops individually extending through the respective holes provided therefor in said head, said body being provided with an outstanding apertured flange, and a plurality of coil springs individually arranged in the respective holes provided therefor in said flange, said coil springs having hooks at their outer ends which are attached to the loops provided therefor on said wire member.

HAROLD R. SNYDER.

References Cited in the file of this patent
UNITED STATES PATENTS

| Number | Name | Date |
|---|---|---|
| 742,040 | Kurtz | Oct. 20, 1903 |
| 1,416,142 | Trumble | May 16, 1922 |
| 2,190,647 | Buicke | Feb. 20, 1940 |
| 2,493,344 | Hamel | Jan. 3, 1950 |
| 2,497,188 | Schindler | Feb. 14, 1950 |